United States Patent Office 3,113,605
Patented Dec. 10, 1963

3,113,605
ANTI-SKID TIRE TREADS AND RUBBER
STOCK THEREFOR
Charles T. Fuetterer, 1720 9th St., Cuyahoga Falls, Ohio, assignor of forty-nine percent to Dan W. Duffy, Cleveland, Ohio
No Drawing. Filed Mar. 30, 1955, Ser. No. 498,089
12 Claims. (Cl. 152—211)

The present invention relates to tread stock for use in preparing tire treads and to rubber tires having an improved tread which stock and tread contain ingredients which improve the traction of the tires when they engage a road or pavement which is wet or which is wholly or partly covered with a water-containing substance, such as snow or ice.

It is well known that tires as now constructed have the tendency to slip or skid when an automobile or truck on which such tires are mounted, is driven over wet or icy roads or pavements. The skidding of the tires not only causes annoyance to the driver but they may also cause serious accidents. This lack of traction of the tires upon wet roads or pavements is also particularly annoying when an attempt is made to start a car or truck on a pavement which is wet or which is partly or wholly covered with snow or ice. In such case, one or more of the wheels of the car or truck may turn on the road or pavement and insufficient traction is provided to move the car. The slipping or skidding of the tires upon wet or icy roads or pavements also heats the tires and may cause severe wear thereon.

The slipping or skidding of the tires upon wet roads and pavements is due to the fact that when the tire engages a wet road or a road covered with a water-containing substance, such as snow or ice, the surface of the tire becomes coated with a film of water which is a good lubricant for rubber, thereby reducing the coefficient of friction between the surface of the tire and the road or pavement. In an attempt to increase the traction between the tire and the pavement under such conditions, manufacturers of tires have modified the tread of the tires, such as by forming grooves or slots therein during the molding operation. It is well known, however, that such changes in the design of the tires has not materially increased the traction of the tires upon wet or icy roads and this is particularly true when the tread of the tires wears down in service.

In accordance with the present invention, an improved rubber stock for use in preparing tire treads and an improved tire tread is provided which contains in a finely divided state a carbohydrate, a protein, or a mixture of a carbohydrate and a protein, which is insoluble or only slightly soluble in cold water but which forms a colloidal suspension in a film of water surrounding the tire tread when an automobile or truck on which the tires are mounted is started or is driven over a wet road or over a road which is wholly or partly covered with snow or ice. My improved tire tread and the rubber stock for preparing the tire tread also contains one or more inorganic salts which are effective in holding the carbohydrate, the protein, or mixture thereof, in colloidal suspension in the film of water which surrounds each of the tire treads when the automobile or truck on which the tires are mounted is driven over wet or icy roads or pavements. I have found that when the tread of a tire contains in a finely divided state a carbohydrate, a protein, or a mixture of a protein and a carbohydrate, which is insoluble or only slightly soluble in cold water, and an inorganic salt for holding the carbohydrate, the protein, or a mixture thereof, in colloidal suspension in water, a small amount of the carbohydrate, protein or mixture thereof, will form a colloidal suspension in the film of water which surrounds one or all of the tires and will minimize or prevent skidding of the tires when an automobile or a truck on which the tires are mounted is being started upon or is driven over wet roads or roads or pavements which are wholly or partly covered with snow or ice.

It is therefore an object of the present invention to provide a tire having an improved tread which has sufficient traction upon a wet road or pavement engaged by the tire to minimize or prevent slipping or skidding of the tire upon the pavement or road when an automobile or truck on which the tires are mounted is being started or driven over wet, snow covered, or icy roads.

Another object of the invention is to provide a tire having an improved tread and to improved stock for producing tire treads which contains in a finely divided state a carbohydrate, a protein, or a mixture thereof, which is insoluble or only slightly soluble in cold water but which forms a colloidal suspension in the film of water which surrounds the tire when an automobile or truck on which the tires are mounted is started or driven over wet or icy roads or pavements, together with one or more inorganic salts which are effective in holding the carbohydrate, the protein, or mixtures thereof, in colloidal suspension in the film of water which surrounds the tires under such conditions. The carbohydrate, protein, or mixture thereof and the inorganic salt which is utilized, must of course be capable of forming a homogeneous tread composition when mixed with rubber and the usual rubber compounding ingredients.

In accordance with the present invention, a carbohydrate, a protein, or mixture thereof, which is insoluble or which is only slightly soluble in cold water but which forms a colloidal suspension therein, together with one or more inorganic salts which are effective in maintaining the carbohydrate, protein, or mixture thereof, in colloidal suspension in the film of water which forms around the tire tread when the tire engages a wet or icy road or pavement, are incorporated in a finely divided state in rubber, together with the other compounding ingredients which have previously been utilized in combination with rubber, to form the rubber stock for forming the tire tread. Consequently, when a tire having a tread which contains a carbohydrate, protein, or a mixture thereof, which is insoluble or is only slightly soluble in cold water but which is capable of forming a colloidal suspension therein and one or more inorganic salts which are effective in maintaining the carbohydrate, protein, or mixture thereof, in colloidal suspension in water, are mounted upon an automobile or truck and engage a wet road or pavement, small portions of these materials will be worn from the tire tread and will form a colloidal suspension in the film of water surrounding the tire or tires and will thus increase the traction of each tire and this is particularly true when the tires engage an icy or snow covered road because under such conditions, any slippage or skidding of the tires melts the snow or ice beneath the tires to form water which is carried in the form of a film around one or more of the tires during the rotation thereof. Any slipping or skidding of the tire will also produce wear upon the tire and a small amount of the carbohydrate or protein, or a mixture thereof, will form a colloidal suspension in the film of water and will be maintained in colloidal suspension therein by the inorganic salt which is present, thereby reducing the lubricating properties of the film of water to thus provide good traction between the tire and the road or pavement on which it is being driven. Because the carbohydrate, protein, or mixture thereof, is incorporated homogeneously throughout the stock which is utilized for forming the tread, it will also be apparent that the deposition of a small amount of the carbohydrate, protein, or mixture thereof, in the film of water that surrounds the tire tread when it is driven over wet or icy pavements or roads will be effective throughout the life of the tire tread.

In practicing my invention, the carbohydrate, protein, or mixture thereof, together with one or more inorganic salts which are effective in maintaining the carbohydrate, protein, or mixture thereof, in colloidal suspension in water, are added in a finely divided state, such as approximately 300 mesh or finer, to the rubber stock which is utilized in forming the usual tire tread and which stock may for convenience be termed the base portion of my improved stock or tread. The carbohydrate, protein or mixture thereof, may be present in an effective amount ranging from more than incidental impurities up to approximately 20% by weight of the base portion of the rubber stock that is utilized in forming the tire tread. Preferably, it is present in an amount ranging from approximately 5% to 15% by weight of the usual rubber tread stock. Any suitable carbohydrate may be utilized which is insoluble or only slightly soluble in cold water but which is capable of forming a colloidal suspension therein, such as starch, dextrin, glycogen, or inulin. Cellulose when it is in the form of a finely divided powder, such as 300 mesh or finer, and which forms a colloidal suspension in water, may also be utilized. Cellulose when in the form of a floc or coarse powder or carbohydrates which are freely soluble in cold water, such as sugar are not suitable.

Although carbohydrates which are insoluble in cold water are preferred for use in my invention, proteins which are in the form of a comparatively fine powder, such as globulins, acid or coagulated albumins, fibrins, crystalline egg albumin, or meal ground from the seed of various plants, such as soy bean, kidney or castor beans, peas, and cow peas, may also be utilized. Proteins which are adhesive, such as glue, are not satisfactory. Some of the proteins mentioned, such as soy, kidney and castor beans, also contain carbohydrates. The protein when utilized must also be in a finely divided state, such as approximately 300 mesh or finer.

I also add to the rubber stock one or more inorganic salts which are effective in maintaining the carbohydrate, the protein, or mixture thereof, in colloidal suspension in the film of water which surrounds the tire when it engages a wet or icy road or pavement. For this purpose, I may utilize a sodium salt, such as sodium carbonate, tricalcium phosphate, magnesium carbonate, or calcium carbonate. Calcium carbonate has heretofore been utilized as an inert filler and magnesium carbonate has heretofore been utilized as a reinforcing agent and as an inert filler in rubber tread stock. Neither of these compounds, however, has been utilized in combination with a carbohydrate, a protein, or a mixture thereof, which is insoluble or only slightly soluble in cold water but which forms a colloidal suspension in a film of water surrounding the tire. The amount of the inorganic salt which is utilized may also range from effective amounts greater than incidental impurities up to 20% by weight of the base portion of the rubber stock. Preferably, however, the inorganic salt or a mixture of two or more of them is present in an amount ranging from 5% to 15% of the weight of rubber stock which has heretofore been utilized in preparing the tire tread.

My improved tire tread stock for producing the tire tread consists of the usual ingredients utilized in manufacting tread stock in addition to the carbohydrate, protein, or mixture of carbohydrate and protein, and the inorganic salt.

In forming the usual tread stock from natural rubber, ingredients are mixed with the rubber including sulphur, an accelerator, an activator for the accelerator, a reinforcing agent, and an antioxidant in the usual desired proportions. For instance, in preparing tread stock, there is compounded with 100 parts by weight of rubber which may be in the form of a smoked sheet, from 2 to 4 parts by weight of sulphur, approximately .5 to 1 part by weight of an accelerator, such as 2-mercaptobenzothiazole, benzothiazyl disulphide, diphenylguanidine, diethyl or dimethyl thiocarbamate, or the zinc salts of the alkylzanthic acids. There is also generally present in the stock an activator for the accelerator, such as from 3 to 5 parts by weight of zinc oxide or a similar amount of stearic acid, aqueous solutions of ammonia, or organic amines, such as monoethanolamine or triethanolamine, a reinforcing agent, such as carbon black, zinc oxide, and certain clays, and a small amount of an antioxidant, such as the condensation product of acetaldol and alpha naphthylamine, the condensation product of acetaldehyde and aniline, or secondary aromatic amines, such as phenyl alpha or beta naphthylamine. Carbon black is usually utilized as the reinforcing agent which may be present in an amount ranging from approximately 40 to 50 parts for each 100 parts of the rubber. A small proportion of various other substances may also be present in the rubber tread stock, such as softeners, inert fillers, retarders, or plasticizers and when 2-mercaptobenzthiazole is utilized as the accelerator, a small amount of an acid, such as lauric or stearic acid is desirable. The particular compounding ingredients and the proportions in which they are utilized in forming tread stock is copiously illustrated in the literature. See, for instance, Rubber and Its Use, by Harry L. Fisher, published in 1941 by Chemical Publishing Company, Inc., Brooklyn, New York, and the Compounding Ingredients for Rubber, Second Edition, 1947, published by the Conway Publishing Co., Inc., New York City. For instance, a rubber stock for producing the tread of a tire may contain the following ingredients in proportion by weight:

| | Parts |
|---|---|
| Smoked sheet of rubber | 100 |
| Sulphur | 3 |
| Mercaptobenzthiazole | 1 |
| Stearic acid | 4 |
| Pine tar | 3 |
| Zinc oxide | 5 |
| Carbon black | 50 |
| Antioxidant | 1 |

As a specific example of my improved tread stock, to each 100 parts by weight of the above tread stock, there may be added in a finely divided state 10% by weight of dextrin, or 10% by weight of coagulated albumin, or 10% by weight of soy bean meal which contains both a carbohydrate and a protein, together with 10% by weight of tricalcium phosphate.

It will of course be understood that if a synthetic rubber, such as neoprene, is utilized in which sulphur is not required for vulcanization, the sulphur may be omitted because in such case, heating alone or heating in the presence of a small amount of zinc oxide or magnesium oxide will produce a permanent change in its physical properties which is very much like that occurring in the vulcanization of natural rubber and when the term vulcanized is used in the claims, it will be understood that it also includes synthetic rubber in which a permanent change is effected in the rubber by the use of heat alone or in combination with zinc oxide or magnesium oxide.

In preparing my improved rubber tread stock and tire tread, the rubber is first masticated in the usual manner, and the carbohydrates or protein, or mixture thereof, and the inorganic salt or salts is mixed with the rubber, together with the sulphur, accelerator, accelerator activator, reinforcing agent, antioxidant, and other desirable ingredients in the usual manner, the sulphur being added last to prevent prevulcanization.

The rubber stock is then tubed to the desired shape and the shaped rubber stock is placed over the carcass of the tire and is secured thereto by an adhesive in the usual manner. The carcass and rubber tread stock are then placed in a mold and are subjected to heat and pressure. The rubber stock softens as it becomes hot and completely fills the mold and flows into the pattern thereof. The temperature of vulcanization may of course vary but will usually range from a few minutes to two or three hours at temperatures ranging from approximately 230° to 290° Fahrenheit.

What is claimed is:

1. A rubber stock for producing tire treads including as the base portion a major proportion of rubber, a sufficient amount of a vulcanizing agent to vulcanize the rubber, and a reinforcing agent in an amount sufficient to provide a tread stock having high abrasive resistance, said rubber stock also including in addition to the base portion a mixture of a nonadhesive protein and a carbohydrate which mixture is substantially insoluble in cold water and which is homogeneously distributed throughout the base portion of the rubber stock, said mixture of carbohydrate and protein being approximately of a particle size that is fine enough to pass through a 300 mesh screen and being present in an effective amount ranging from more than incidental impurities up to 20% by weight of the base portion of the rubber stock, and an inorganic salt that is capable of holding a mixture of said carbohydrate and protein in colloidal suspension in water, said inorganic salt being in a sufficiently finely divided state to form a homogeneous mixture with the base portion of the rubber stock and being homogeneously distributed throughout the base portion of the rubber stock and being present in an effective amount ranging from more than incidental impurities up to 20% by weight of the base portion of the rubber stock and in an amount sufficient to hold the mixture of carbohydrate and protein in colloidal suspension in a film of water which forms around a tire tread composed of the stock when the tread rotatably engages a wet or icy road or pavement and small particles of the base portion of the rubber stock and small particles of the carbohydrate, protein, and the inorganic salt are worn from the tread.

2. A rubber stock for producing tire treads including as the base portion a major proportion of rubber, a sufficient amount of a vulcanizing agent to vulcanize the rubber, and a reinforcing agent in an amount sufficient to provide a tread stock having a high abrasive resistance, said rubber stock also including in addition to the base portion a mixture of a nonadhesive protein and a carbohydrate which mixture is substantially insoluble in cold water and which is homogeneously distributed throughout the rubber stock, said mixture of protein and carbohydrate being approximately of a particle size that is fine enough to pass through a 300 mesh screen and being present in an amount ranging from approximately 5% to 20% by weight of the base portion of the rubber stock, and an inorganic salt that is capable of holding a mixture of said protein and carbohydrate in colloidal suspension in water, said inorganic salt being in a sufficiently finely divided state to form a homogeneous mixture with the base portion of the rubber stock and being homogeneously distributed throughout the base portion of the rubber stock and being present in an amount ranging from approximately 5% to 20% by weight of the base portion of the stock and in an amount sufficient to hold the mixture of the protein and carbohydrate in colloidal suspension in a film of water which forms around a tire tread composed of the stock when the tread rotatably engages a wet or icy road or pavement and small particles of the base portion of the rubber stock and small particles of the carbohydrate, protein, and the inorganic salt wear from the tread.

3. A rubber stock for producing tire treads including as the base portion a major proportion of rubber, a sufficient amount of a vulcanizing agent to vulcanize the rubber, and a reinforcing agent in an amount sufficient to provide a tread stock having high abrasive resistance, said rubber stock also including in addition to the base portion a carbohydrate that is substantially insoluble in cold water and which is homogeneously distributed throughout the rubber stock, said carbohydrate being approximately of a particle size that is fine enough to pass through a 300 mesh screen and being present in an effective amount ranging from more than incidental impurities up to 20% by weight of the base portion of the rubber stock, and an inorganic salt that is capable of holding said carbohydrate in colloidal suspension in water, said inorganic salt being in a sufficiently finely divided state to form a homogeneous mixture with the base portion of the rubber stock and being homogeneously distributed throughout the base portion of the rubber stock and being present in an effective amount ranging from more than incidental impurities up to 20% by weight of the base portion of the rubber stock and in an amount sufficient to hold the carbohydrate in colloidal suspension in a film of water which forms around a tire tread composed of the stock when the tread rotatably engages a wet or icy road and small particles of the base portion of the rubber stock and small particles of the carbohydrate and the inorganic salt are worn from the tread.

4. A rubber stock for producing tire treads including as the base portion of the rubber stock a major proportion of rubber, a sufficient amount of a vulcanizing agent to vulcanize the rubber, and a reinforcing agent in an amount sufficient to provide a tread stock having a high abrasive resistance, said rubber stock also including in addition to the base portion a carbohydrate homogeneously distributed throughout the rubber stock which carbohydrate is approximately of a particle size which is fine enough to pass through a 300 mesh screen and is present in an amount ranging from approximately 5% to 20% by weight of the base portion of the rubber stock, and an inorganic salt that is capable of holding said carbohydrate in colloidal suspension in water, said inorganic salt being in a sufficiently finely divided state to form a homogeneous mixture with the base portion of the rubber stock and being homogeneously distributed throughout the base portion of the rubber stock and being present in an amount ranging from approximately 5% to 20% by weight of the base portion of the rubber stock and in an amount sufficient to hold the carbohydrate in colloidal suspension in a film of water which forms around a tire tread composed of the stock when the tread rotatably engages a wet or icy road and small particles of the base portion of the rubber stock and small particles of the carbohydrate and inorganic salt are worn from the tread.

5. A rubber stock for producing tire treads including as the base portion of the rubber stock a major proportion of rubber, a sufficient amount of a vulcanizing agent to vulcanize the rubber, and a reinforcing agent in an amount sufficient to provide a tread stock having high abrasive resistance, said rubber stock also including in addition to the base portion a nonadhesive protein homogeneously distributed throughout the base portion of the rubber stock, said protein being substantially insoluble in cold water and being approximately of a particle size which is fine enough to pass through a 300 mesh screen and being present in an effective amount ranging from more than incidental impurities up to 20% by weight of the base portion of the rubber stock, and an inorganic salt that is capable of holding said protein in colloidal suspension in water, said inorganic salt being in a sufficiently finely divided state to form a homogeneous mixture with the base portion of the rubber stock and being homogeneously distributed throughout the base portion of the rubber stock and in an amount sufficient to hold the protein in colloidal suspension in a film of water which forms around a tire tread composed of the stock when the tread rotatably engages a wet or icy road or pavement and small particles of the base portion of the rubber stock and small particles of the protein and inorganic salt are worn from the tread.

6. A rubber stock for producing tire treads including as the base portion of the stock a major proportion of rubber, a sufficient amount of a vulcanizing agent to vulcanize the rubber, and a reinforcing agent in an amount sufficient to provide a tread stock having high abrasive resistance, said rubber stock also including in addition to the base portion a nonadhesive protein that is substantially insoluble in cold water, said protein being homogeneously distributed throughout the rubber stock and being approximately of a particle size fine enough to pass through a 300 mesh screen and being present in an amount ranging from approximately 5% to 20% by weight of the base portion of the rubber stock, and an inorganic salt that is capable of holding said protein in colloidal suspension in water, said inorganic salt being in a sufficiently finely divided state to form a homogeneous mixture with the base portion of the rubber stock and being homogeneously distributed throughout the base portion of the rubber stock and being present in an amount ranging from approximately 5% to 20% by weight of the base portion of the rubber stock and in an amount sufficient to hold the protein in colloidal suspension in a film of water which forms around a tire tread composed of the stock when the tread rotatably engages a wet or icy road or pavement and small particles of the base portion of the rubber stock and small particles of the protein and the inorganic salt are worn from the tread.

7. A rubber tire having a homogeneous vulcanized tire tread including as a base portion a major proportion of rubber and a sufficient amount of a reinforcing agent to provide a tread having a high abrasive resistance, said tread also including in addition to the base portion a mixture of a nonadhesive protein and a carbohydrate, said mixture of protein and carbohydrate being present in an amount ranging from more than incidental impurities up to 20% by weight of the base portion of the tread and said mixture of carbohydrate and protein being substantially insoluble in cold water and being of a particle size which is approximately fine enough to pass through a 300 mesh screen and being homogeneously distributed throughout the base portion of the tire tread, and an inorganic salt that is capable of holding the mixture of carbohydrate and protein in colloidal suspension in water, said inorganic salt being present in a sufficiently finely divided state to form a homogeneous mixture with the base portion of the tread and being present in an effective amount ranging from more than incidental impurities up to 20% by weight of the base portion of the tread and in an amount sufficient to hold the mixture of carbohydrate and protein in colloidal suspension in a film of water which forms around the tread when the tread rotatably engages a wet or icy road and small particles of the base portion of the tread and small particles of the carbohydrate, protein, and inorganic salt are worn from the tread.

8. A rubber tire having a homogeneous vulcanized tire tread including as a base portion a major proportion of rubber and a sufficient amount of a reenforcing agent to provide a tread having a high abrasive resistance, said tread also including in addition to the base portion a mixture of a nonadhesive protein and a carbohydrate in an amount ranging from approximately 5% to 20% by weight of the base portion of the tire tread, said mixture of carbohydrate and protein being substantially insoluble in cold water and being of a particle size that is approximately fine enough to pass through a 300 mesh screen and being homogeneously distributed throughout the base portion of the tire tread, and an inorganic salt that is capable of holding the mixture of carbohydrate and protein in colloidal suspension in water, said inorganic salt being in a sufficiently finely divided state to form a homogeneous mixture with the base portion of the tire tread and being homogeneously distributed throughout the rubber stock and being present in an amount ranging from approximately 5% to 20% by weight of the base portion of the tire tread and in an amount sufficient to hold the mixture of carbohydrate and protein in colloidal suspension in a film of water which forms around the tread when the tread rotatably engages a wet or icy road or pavement and small particles of the carbohydrate, protein, and inorganic salt are worn from the tread.

9. A rubber tire having a homogeneous vulcanized tire tread including as a base portion a major proportion of rubber and a sufficient amount of a reenforcing agent to provide a tread having a high abrasive resistance, said tread also including in addition to the base portion a carbohydrate in an effective amount ranging from more than incidental impurities up to 20% by weight of the base portion of said tread, said carbohydrate being substantially insoluble in cold water and being of a particle size which is approximately fine enough to pass through a 300 mesh screen and being homogeneously distributed throughout the base portion of the tire tread, and an inorganic salt that is capable of holding said carbohydrate in colloidal suspension in water, said inorganic salt being in a sufficiently finely divided state to form a homogeneous mixture with the base portion of the tire tread and being homogeneously distributed throughout the tire tread and being present in an effective amount ranging from more than incidental impurities up to 20% by weight of the base portion of said tread and in an amount sufficient to hold the carbohydrate in colloidal suspension in the film of water which forms around the tire tread when the tread rotatably engages a wet or icy road or pavement and small particles of the rubber stock, carbohydrate, and inorganic salt are worn from the tread.

10. A rubber tire having a homogeneous vulcanized tire tread including as a base portion a major proportion of rubber and a sufficient amount of a reinforcing agent to provide a tread having a high abrasive resistance, said tread also including in addition to the base portion a carbohydrate in an amount ranging from approximately 5% to 20% by weight of the base portion of said tread, said carbohydrate being substantially insoluble in cold water and being of a particle size which is approximately fine enough to pass through a 300 mesh screen and being homogeneously distributed throughout the tire tread, and an inorganic salt that is capable of holding the carbohydrate in colloidal suspension in water, said inorganic salt being in a sufficiently finely divided state to form a homogeneous mixture with the base portion of said tread and being homogeneously distributed throughout the base portion of the tire tread and being present in an amount ranging from approximately 5% to 20% by weight of the base portion of the tread and in an amount sufficient to hold the carbohydrate in colloidal suspension in a film of water which forms around the tread when the tread rotatably engages a wet or icy road and small particles of the base portion of the tread and small particles of the carbohydrate and inorganic salt are worn from the tread.

11. A rubber tire having a homogeneous vulcanized tire tread including as a base portion a major proportion of rubber and a sufficient amount of a reinforcing agent to provide a tread having a high abrasive resistance, said tread also including in addition to the base portion a nonadhesive protein that is present in an effective amount ranging from more than incidental impurities up to 20% by weight of the base portion of the tread, said protein being substantially insoluble in cold water and being of a particle size that is approximately fine enough to pass through a 300 mesh screen and being homogeneously distributed throughout the base portion of the tire tread, and an inorganic salt that is capable of holding said protein in colloidal suspension in water, said inorganic salt being in a sufficiently finely divided state to form a homogeneous mixture with the base portion of the tire tread and being homogeneously distributed in a finely divided state throughout the tire tread and being present in an effective amount ranging from more than incidental impurities up to 20% by weight of the base portion of the tread and in an amount sufficient to hold the protein in colloidal suspension in a film of water which forms around the tire tread when the tread rotatably engages a wet or icy road and small particles of the base portion of the tread and small particles of the protein and the inorganic salt wear from the tread.

12. A rubber tire having a homogeneous vulcanized tire tread including as a base portion a major proportion of rubber and a sufficient amount of a reinforcing agent to provide a tread having a high abrasive resistance, said tread also including in addition to the base portion a non-adhesive protein in an amount ranging from approximately 5% to 20% by weight of the base portion of the tire tread, said protein being substantially insoluble in cold water and being of a particle size which is approximately fine enough to pass through a 300 mesh screen and being homogeneously distributed throughout the base portion of the tire tread, and an inorganic salt that is capable of holding said protein in colloidal suspension in water, said inorganic salt being in a sufficiently finely divided state to form a homogeneous mixture with the base portion of the tire tread and being present in an amount ranging from approximately 5% to 20% by weight of the base portion of the tread and in an amount sufficient to hold the protein in colloidal suspension in a film of water which forms around the tread when the tread engages a wet or icy road and small particles of the base portion of the tread and small particles of the protein and inorganic salt wear from the tread.

References Cited in the file of this patent

UNITED STATES PATENTS

| | | |
|---|---|---|
| 1,458,828 | Johnson | June 12, 1923 |
| 2,127,560 | Haslam | Aug. 23, 1938 |
| 2,585,219 | Boyle | Feb. 12, 1952 |
| 2,739,135 | Delang | Mar. 20, 1956 |

FOREIGN PATENTS

| | | |
|---|---|---|
| 183,922 | Great Britain | July 31, 1922 |

OTHER REFERENCES

Davis et al.: "Chemistry and Technology of Rubber," published by Reinhold Publishing Corporation, 1937, pages 18, 20, 26, 27 and 53.